United States Patent
Kim et al.

(10) Patent No.: US 9,207,087 B2
(45) Date of Patent: Dec. 8, 2015

(54) SERVER, NAVIGATION SYSTEM, VEHICLE NAVIGATION SYSTEM, AND METHOD FOR PROVIDING IMAGES OF VEHICLE NAVIGATION SYSTEM

(75) Inventors: Heungwon Kim, Seoul (KR); Seungwan Woo, Seoul (KR); Wonkeun Lee, Gyunggi-do (KR); Haeil Lee, Seoul (KR)

(73) Assignee: Intellectual Discovery Co., Ltd., Seoul (KR)

( * ) Notice: Subject to any disclaimer, the term of this patent is extended or adjusted under 35 U.S.C. 154(b) by 189 days.

(21) Appl. No.: 13/519,685

(22) PCT Filed: Mar. 2, 2011

(86) PCT No.: PCT/KR2011/001419
§ 371 (c)(1),
(2), (4) Date: Aug. 15, 2012

(87) PCT Pub. No.: WO2011/108836
PCT Pub. Date: Sep. 9, 2011

(65) Prior Publication Data
US 2012/0323480 A1    Dec. 20, 2012

(30) Foreign Application Priority Data
Mar. 5, 2010    (KR) .................. 10-2010-0020013

(51) Int. Cl.
*G01C 21/00*    (2006.01)
*G06T 17/00*    (2006.01)
*G09G 5/00*    (2006.01)
*G01C 21/26*    (2006.01)
*G01C 21/36*    (2006.01)

(52) U.S. Cl.
CPC ............ *G01C 21/26* (2013.01); *G01C 21/3602* (2013.01); *G01C 21/3697* (2013.01)

(58) Field of Classification Search
CPC .... G01C 21/36; G01C 21/3602; G01C 21/00; G06T 17/00; G06T 1/00; G09G 5/00
USPC ..................................... 701/409, 430
See application file for complete search history.

(56) References Cited

U.S. PATENT DOCUMENTS 5,983,161 A * 11/1999 Lemelson et al. ............ 701/301
2004/0066970 A1* 4/2004 Matsugu ....................... 382/217
2006/0028558 A1* 2/2006 Sato et al. ................. 348/211.99

(Continued)

FOREIGN PATENT DOCUMENTS

CN          1767638 A       5/2006
KR    10-2007-0099112      10/2007

(Continued)

OTHER PUBLICATIONS

International Search Report, PCT Application No. PCT/KR2011/001419, mailed Oct. 25, 2011, (2 pages).

*Primary Examiner* — Calvin Cheung
*Assistant Examiner* — Martin Weeks
(74) *Attorney, Agent, or Firm* — Fox Rothschild LLP

(57) ABSTRACT

Disclosed are a server, a navigation system, a vehicle navigation system, and a method for providing images of a vehicle navigation system. According to the present invention, the vehicle navigation system processes image data obtained through a vehicle black box and transmits the processed image data to a server or a user terminal.

21 Claims, 16 Drawing Sheets

(56) References Cited

U.S. PATENT DOCUMENTS

| | | | |
|---|---|---|---|
| 2007/0292048 A1* | 12/2007 | Choe et al. | 382/286 |
| 2008/0312786 A1* | 12/2008 | Day | 701/33 |
| 2009/0172527 A1 | 7/2009 | Buecker et al. | |
| 2009/0254268 A1* | 10/2009 | Figueroa | 701/201 |
| 2010/0067893 A1* | 3/2010 | Iwasaki et al. | 396/147 |
| 2010/0134826 A1* | 6/2010 | Ishigure | 358/1.15 |
| 2011/0313653 A1* | 12/2011 | Lindner | 701/201 |

FOREIGN PATENT DOCUMENTS

| | | |
|---|---|---|
| KR | 10-2009-0121791 | 11/2009 |
| WO | WO 2006/049750 | 5/2006 |

\* cited by examiner

SERVER, NAVIGATION SYSTEM, VEHICLE NAVIGATION SYSTEM, AND METHOD FOR PROVIDING IMAGES OF VEHICLE NAVIGATION SYSTEM

CROSS REFERENCE TO RELATED APPLICATIONS

This application is the national entry under 35 USC 371 for PCT/KR2011/001419, filed Mar. 2, 2011, which claims priority to Korean Application No. 10-2010-0020013, filed Mar. 5, 2012. The content of the foregoing applications is incorporated herein by reference.

TECHNICAL FIELD

The present invention relates to a server, a navigation system, a vehicle navigation system and a route guidance method of a vehicle navigation system.

BACKGROUND ART

With the popularization of the Internet and modification of position information related laws, location based service (LBS) related industries are activated. Devices using the LBS include a vehicle navigation system which measures a current location of a vehicle or guides a route to a destination.

To judge the negligence in an accident occurring when a vehicle stops or runs, objective data is needed in many cases. Accordingly, a vehicle black box capable of providing the objective data is used and the number of vehicles equipped with the black has recently increased.

Images captured by the vehicle black box are used only to acquire information about car accidents. However, the images captured by the vehicle black box need to be used in various fields because the images include various information about roads.

DETAILED DESCRIPTION OF THE INVENTION

Technical Problems

An object of the present invention is to provide a server, a navigation system, a vehicle navigation system and a method for providing images of the vehicle navigation system, to enable images captured through a vehicle black box to be made into contents or used in various fields.

Technical Solutions

According to an aspect of the present invention, a system for displaying cached webpages includes:
According to another aspect of the present invention, a server for displaying cached webpages includes: ///

Advantageous Effects

According to the present invention, the navigation system can share image data obtained through the vehicle black box with other users. Accordingly, users can simulate a moving route to a destination through the image data captured by other vehicles. Furthermore, the users can obtain useful information about good restaurants, travel sites, accident black sports, etc. through theme image data generated by other navigation systems.

In addition, it is possible to use image data captured by the navigation system as legal evidential data and prevent crime and car accident dispute.

Moreover, it is possible to make profits or be provided with various benefits by processing image data obtained through the navigation system into theme image data by inserting audio data, a note, etc. into the image data and uploading the them image data to the content server 70.

BEST MODE FOR CARRYING OUT THE INVENTION

Now, the above and other aspects of the present invention will be described in detail through preferred embodiments with reference to the accompanying drawings so that the present invention can be easily understood and realized by those skilled in the art. Modifications to the preferred embodiment will be readily apparent to those of ordinary skill in the art, and the disclosure set forth herein may be applied to other embodiments and applications without departing from the spirit and scope of the present invention and the appended claims. In the following description of the present invention, a detailed description of known functions and configurations incorporated herein will be omitted when it may obscure the subject matter of the present invention. The same reference numbers will be used throughout this specification to refer to the same or like parts. Further, numerals (e.g. first, second, etc.) used to describe the present invention are merely identifiers for discriminating one component from other components.

A navigation system according to the present invention will now be described in detail with reference to the attached drawings. The terms "module" and "part" used to signify components are used herein to help the understanding of the components and thus they should not be considered as having specific meanings or roles.

Figure 1:
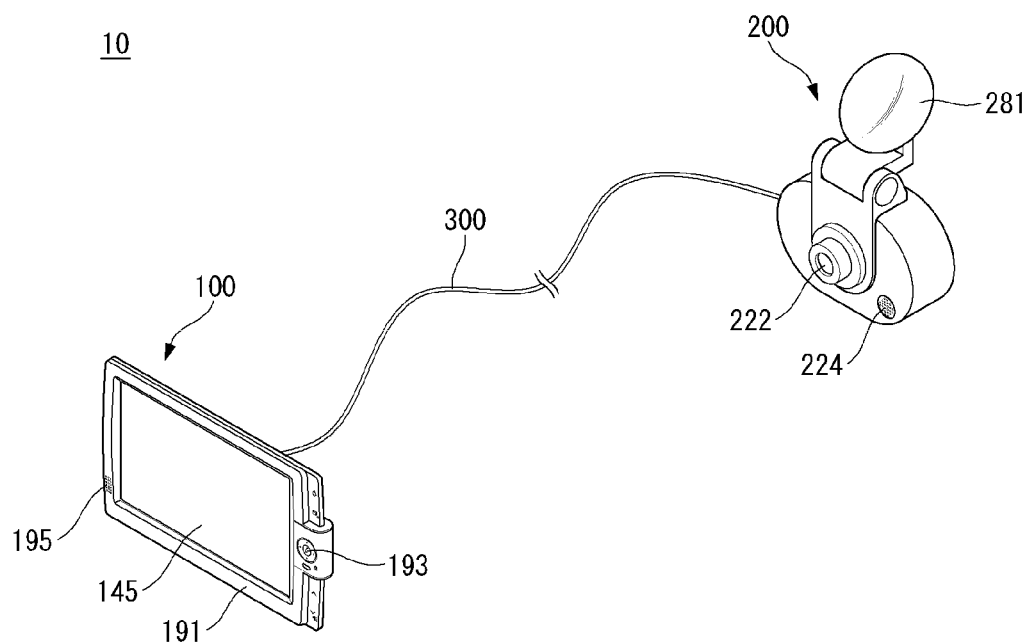
FIG. 1 illustrates an exemplary navigation system related to embodiments of the present invention.

FIG. 1 illustrates a navigation system according to an embodiment of the present invention.

Referring to FIG. 1, the navigation system 10 according to an embodiment of the present invention may include a vehicle navigation system 100 and a vehicle black box 200.

The navigation system 10 may be a system that informs a driver or a passenger of a vehicle of information about driving and maintenance of the vehicle. The navigation system 10 may be the vehicle navigation system 100 in a narrow sense and may be a system including various electronic devices connected with the vehicle navigation system 100 by wire or wirelessly in a broad sense. That is, electronic devices capable of complementing and augmenting the function of the vehicle navigation system 100 can be connected with the vehicle navigation system 100 to implement the integrated navigation system 10. The electronic devices capable of implementing the navigation system 10 by being connected with the vehicle navigation system 100 may include a mobile terminal that can be linked to a mobile communication network, a remote controller, etc. Furthermore, the electronic devices may include the vehicle black box 200. The vehicle black box 200 may be integrated with or separated from the vehicle navigation system 100. While FIG. 1 shows that the vehicle black box 200 is provided separately from the vehicle navigation system 100 and connected with the vehicle navigation system 100 through a communication cable 300, the vehicle black box 200 can be integrated with the vehicle navigation system 100.

The vehicle navigation system 100 may include a display 145 attached to the front of a navigation housing 191, a navigation operation key 193, and a navigation microphone 195.

The navigation housing 191 forms the external appearance of the vehicle navigation system 100. The vehicle navigation system 100 may be exposed to various external environments such as high or low temperature for seasonal reason, direct/indirect external shocks, etc. The navigation housing 191 may protect internal electronic components of the vehicle navigation system 100 from external environment variations and make the external appearance of the vehicle navigation system 100 beautiful. To achieve this, the navigation housing 191 may be formed by injection molding using a material such as ABS, PC or reinforced engineering plastics.

The display 145 visually displays various types of information. Information displayed on the display 145 may include map data combined with route information, images of broadcast programs including DMB broadcast programs, and images stored in a memory. The display 145 may be divided into several regions physically or logically. Physically divided displays mean two or more displays connected to each other. Logically divided displays mean a display of a plurality of independent screens on one display 145. For example, route information is displayed on part of the display 145 while a received DMB broadcast program is displayed on the display 145, or a map and the DMB broadcast program are respectively displayed on different regions of the display 145. With the tendency of convergence of various functions into the vehicle navigation system 100, the display 145 is increasingly logically divided to display various types of information. Furthermore, to display a large amount of information, the screen of the display 145 becomes larger.

All or some of the surface of the display 145 may be a touchscreen capable of receiving a touch input from a user. For example, the touchscreen function can be activated by touching a function selection button displayed on the display 145. That is, the display 145 can function as both an output unit 140 shown in FIG. 3 and an input unit 120 shown in FIG. 3.

The navigation operation key 193 may be provided to execute various functions of the vehicle navigation system 100 or to allow a user to directly input necessary data. Frequently used specific functions may be mapped to the navigation operation key 193 to improve user convenience.

The navigation microphone 195 may be provided to receive sounds including voices. For example, a specific function of the navigation device 100 can be executed on the basis of a voice signal received through the navigation microphone 195. Furthermore, it is possible to detect a current state of the vehicle, such as an accident, on the basis of a sound signal received through the navigation microphone 195.

The vehicle black box 200 may store information necessary for a procedure of dealing with an accident by exchanging signals with the vehicle navigation system 100. For example, When an accident occurs while the vehicle runs, it is possible to analyze an image acquired by the vehicle black box 200 and use the image to determine the details of the accident and a degree of the accident. Furthermore, the vehicle black box 200 connected to the vehicle navigation system 100 can use information stored in the vehicle navigation system 100. For example, it is possible to map images obtained from the vehicle black box 200 with map data stored in the vehicle navigation system 100 to improve the utility of the vehicle black box 200.

The vehicle black box 200 can obtain information on the vehicle when the vehicle runs or stops. That is, the vehicle black box 200 can capture an image not only when the vehicle runs but also when the vehicle stops. The quality of an image obtained through the vehicle black box 200 may be fixed or variable. For example, the picture quality can be increased in the event of an accident and decreased in a normal case so as to store a salient image while minimizing a necessary storage space.

The vehicle black box 200 may include a black box camera 222, a black box microphone 224, and an attachment part 281.

The black box camera 222 can take pictures of the inside and outside of the vehicle. The vehicle black box 200 may include one or more black box cameras 222. When the vehicle black box 200 include a plurality of black box cameras 222, one of the black box cameras 222 may be integrated with the vehicle black box 200 and others may be attached to portions of the vehicle to capture images and transmit the captured images to the vehicle black box 200. When the vehicle block box 200 includes one black box camera 222, the black box camera 222 may be installed such that it can photograph a forward view of the vehicle. Images captured by the black box camera 222 may be stored in the vehicle black box 200 or the vehicle navigation system 100.

The black box microphone 224 may acquire a sound generated from the inside or outside of the vehicle. The black box microphone 224 may execute functions similar to those of the above-mentioned navigation microphone 195.

The attachment part 281 may fix the vehicle black box 200 to the vehicle. The attachment part 281 may be a suction plate capable of attaching the vehicle black box 200 to the windshield of the vehicle or a fixing device capable of combining the vehicle black box 200 with the room mirror of the vehicle.

Figure 2:
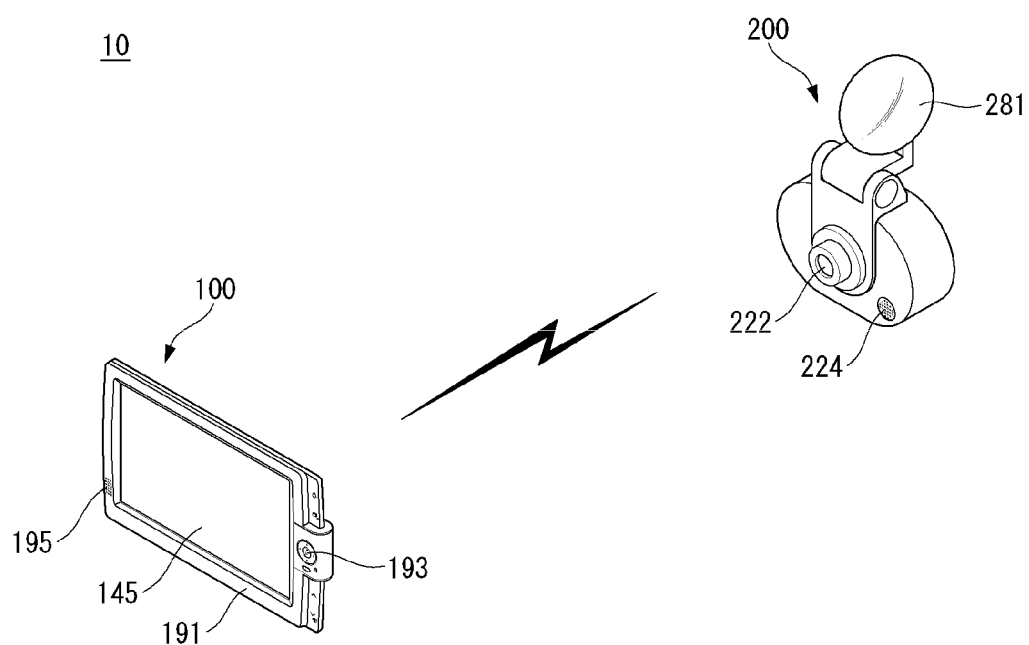
FIG. 2 illustrates another exemplary navigation system related to the embodiments of the present invention.

FIG. 2 illustrates a navigation system according to another embodiment of the present invention. Only parts different from the above-described embodiment will now be described.

The navigation system 10 according to another embodiment of the present invention may be wirelessly connected to the vehicle navigation system 100 and the vehicle block box 200. That is, the vehicle navigation system 100 and the vehicle black box 200 may be separate devices having no physical connecting device therebetween. The vehicle navigation system 100 and the vehicle black box 200 may communicate with each other through Bluetooth, RFID (Radio Frequency Identification), IrDA (Infrared Data Association), UWB (Ultra WideBand), ZigBee, etc.

Figure 3:
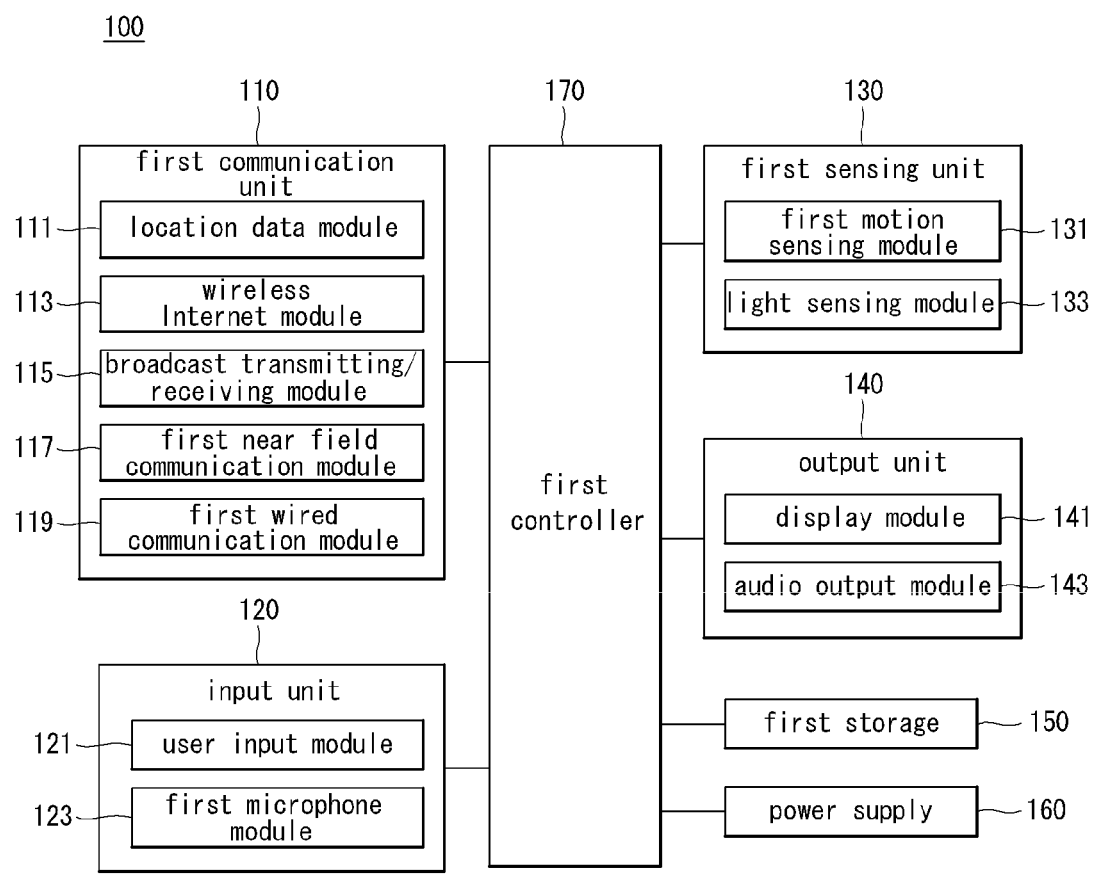
FIG. 3 is a block diagram of a vehicle navigation system shown in FIG. 1.

FIG. 3 is a block diagram of the vehicle navigation system 100 shown in FIG. 1.

Referring to FIG. 3, the vehicle navigation system 100 according to an embodiment of the present invention may include a first communication unit 110, an input unit 120, a first sensing unit 130, an output unit 140, a first storage 150, a power supply 160, and a first controller 170.

The first communication unit 100 is provided for the vehicle navigation system 100 to communicate with other devices. The first communication unit 100 may include a first location information module 111, a wireless Internet module 113, a broadcast transmitting/receiving module 115, a first near field communication module 117, and a first wired communication module 119.

The first location information module 111 acquires location information through a GNSS (Global Navigation Satellite System). The GNSS is a navigation system that calculates the location of a receiver terminal using a radio signal received from an artificial satellite (20 shown in FIG. 5). Examples of the GNSS may include GPS (Global Positioning System), Galileo, GLONASS (Global Orbiting Navigational Satellite System), COMPASS, IRNSS (Indian Regional Navigational Satellite System), QZSS (Quasi-Zenith Satellite System), etc. The first location information module of the vehicle navigation system 100 may obtain location information by receiving a GNSS signal provided in an area where the vehicle navigation system 100 is used.

The wireless Internet module 113 acquires information or transmits information by accessing wireless Internet. The wireless Internet accessible by the wireless Internet module 113 may include WLAN (Wireless LAN), WiBro (Wireless Broadband), Wimax (World interoperability for microwave access), HSDPA (High speed Downlink Packet Access), etc.

The broadcast transmitting/receiving module 115 transmits/receives broadcast signals through broadcasting systems. The broadcasting systems may include DMBT (Digital Multimedia Broadcasting Terrestrial), DMSS (Digital Multimedia Broadcasting Satellite), MediaFLO (Media Forward Link Only), DVBH (Digital Video Broadcast Handheld), ISDBT (Integrated Services Digital Broadcast Terrestrial), etc. Broadcast signals transmitted/received through the broadcast transmitting/receiving module 115 may include traffic information, living information, images captured by the vehicle black box (200 shown in FIG. 1), etc.

The first near field communication module 117 is a device for near field communication. The first near field communication module 117 can perform communication through Bluetooth, RFID, IrDA, UWB, ZigBee, etc.

The first wired communication module 119 is an interface capable of connecting the vehicle navigation system 100 to other devices by wire. The first wired communication module 119 may be a USB module capable of performing communication through a USB port. The vehicle navigation system 100 according to embodiments of the present invention can communicate with other devices through the first near field communication module 117 or the first wired communication module 119. Furthermore, when the vehicle navigation system 100 communicates with a plurality of devices, the vehicle navigation system 100 may communicate with one of the devices through the first near field communication module 117 and communicate with the other through the first wired communication module 119.

The input unit 120 converts an external physical input applied to the vehicle navigation system 100 into an electric signal. The input unit 120 may include a user input module 121 and a first microphone module 123.

The user input module 121 is a key input unit through which a user can apply an input through a push operation. The user input module 121 may be implemented as the navigation operation key (193 shown in FIG. 1) provided to the exterior of the housing (191 shown in FIG. 1) of the vehicle navigation system 100.

The first microphone module 123 receives a user voice and a sound generated from the inside or outside of the vehicle. The first microphone module 123 may be implemented as the navigation microphone (195 shown in FIG. 1) provided to the exterior of the housing (191 shown in FIG. 1) of the vehicle navigation system 100.

The first sensing unit 130 senses a current state of the vehicle navigation system 100. The first sensing unit 130 may include a first motion sensing module 131 and a light sensing module 133.

The first motion sensing module 131 may sense a three-dimensional motion of the vehicle navigation system 100. The first motion sensing module 131 may include a 3-axis geomagnetic sensor and a 3-axis acceleration sensor. It is possible to calculate a more accurate trace of the vehicle equipped with the vehicle navigation system 100 by combining motion information acquired through the first motion sensing module 131 with location information obtained through the location information module 111.

The light sensing module 133 measures surrounding illuminance of the vehicle navigation system 100. It is possible to control the brightness of the display 145 to be varied with the surrounding illuminance using illuminance information acquired through the light sensing module 133.

The output unit 140 outputs information on the vehicle navigation system 100. The output unit 140 may include a display module 141 and an audio output module 143.

The display module 141 outputs visually recognizable information about the vehicle navigation system 100. The display module 141 may be implemented as the display (145 shown in FIG. 1) provided to the front of the housing (191 shown in FIG. 1) of the vehicle navigation system 100. If the display module 141 is a touchscreen, the display module 141 can function as both the output unit 140 and the input unit 120, as described above.

The audio output module 143 outputs auditorily recognizable information about the vehicle navigation system 100. The audio output module 143 may be implemented as a speaker outputting information that needs to be signaled to users including a driver as sound.

The first storage 150 stores information necessary for operation of the vehicle navigation system 100 and information generated according to the operation. The first storage 150 may be a memory built in the vehicle navigation system 100 or a detachable memory. The information necessary for the operation of the vehicle navigation system 100 may include an OS, route search application, map, etc. The information generated according to the operation of the vehicle navigation system 100 may include information about a searched route, a received image, etc.

The power supply 160 supplies power necessary for the operation of the vehicle navigation system 100 or operations of other devices connected to the vehicle navigation system 100. The power supply 160 may be a device provided with power from a battery set in the vehicle navigation system 100 or an external power supply. The power supply 160 may be implemented as the first wired communication module 119 or a device wirelessly provided with power, according to power supply form.

The first controller 170 outputs control signals for controlling operations of the vehicle navigation system 100. Furthermore, the first controller 170 may output control signals for controlling other devices connected to the vehicle navigation system 100.

Figure 4:
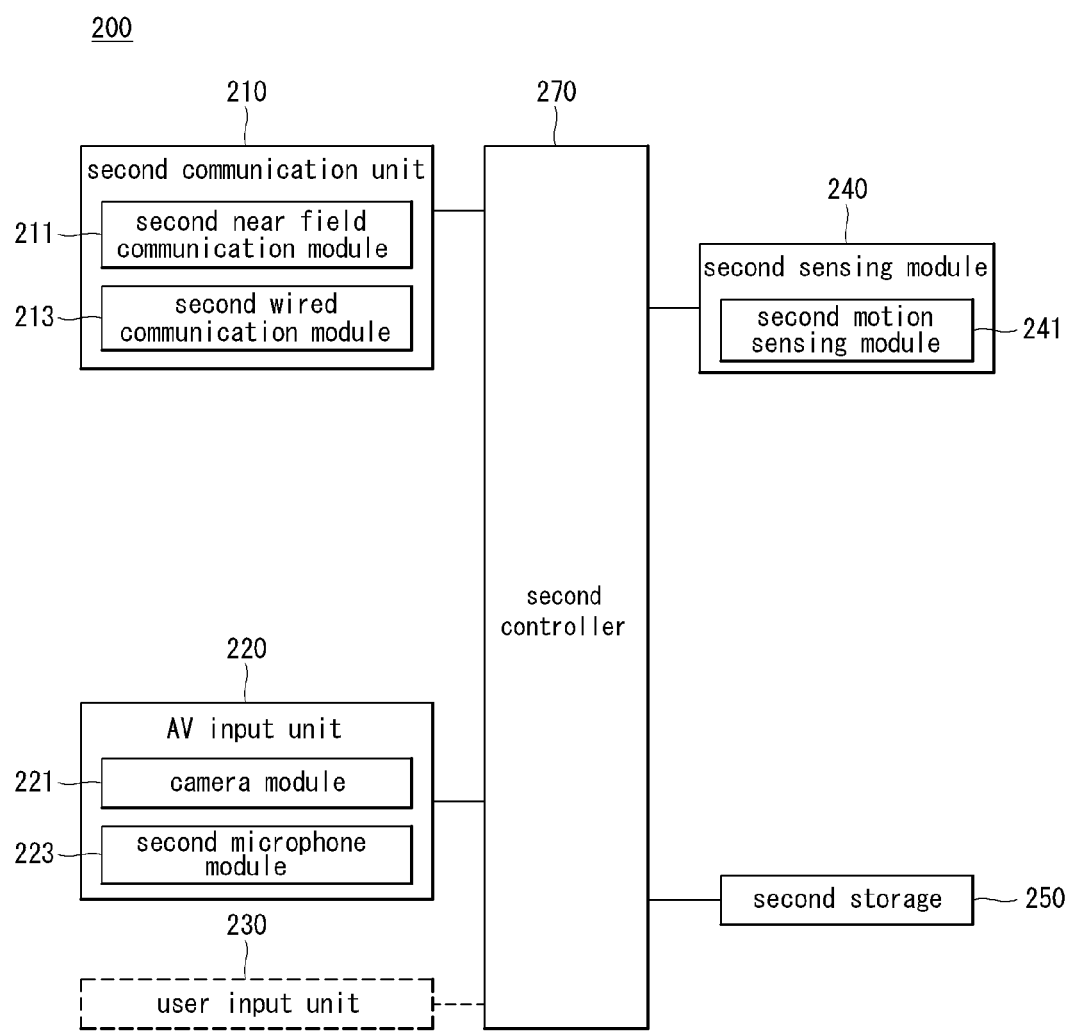
FIG. 4 is a block diagram of a vehicle block box shown in FIG. 1.

FIG. 4 is a block diagram of the vehicle black box 200 shown in FIG. 1.

Referring to FIG. 4, the vehicle black box 200 according to an embodiment of the present invention may include a second communication unit 210, an AV input unit 220, a user input unit 230, a second sensing unit 240, and a second storage 250.

The second communication unit 210 may communicate with the first communication unit 110 of the vehicle navigation system (100 shown in FIG. 3) or other devices. The second communication unit 210 may include a second location information module 211, a second near field communication module 213, and a second wired communication module 215. The second location information module 211 performs an operation similar to that of the first location information module (111 shown in FIG. 3). The second near field communication module 213 can communicate with the first near field communication module (117 shown in FIG. 3) and the second wired communication module 215 can communicate with the first wired communication module (119 shown in FIG. 3).

The AV input unit 220 may acquire sounds and images. The AV input unit 220 may include a camera module 221 and a second microphone module 223.

The camera module 221 may capture images of the inside and outside of the vehicle equipped with the vehicle black box 200. The camera module 221 may be implemented as the black box camera (222 shown in FIG. 1), as described above.

The second microphone module 223 may obtain sounds generated from the inside and outside of the vehicle. The sounds obtained through the second microphone module 223 may be used to control operation of the vehicle black box 200. For example, when a sound with higher intensity is received through the second microphone module 223, the camera module 221 can be controlled to capture an image with higher resolution. The second microphone module 223 may be implemented as the black box microphone 224.

The user input unit 230 is a device through which a user directly operates the vehicle black box 200. The user input unit 230 may be implemented as a push button (not shown) provided to the exterior of the vehicle black box 200. If the vehicle black box 200 is controlled by a control signal of the first controller (170 shown in FIG. 3) of the vehicle navigation system (100 shown in FIG. 3), the user input unit 230 may be excluded from the vehicle black box 200.

The second sensing unit 240 may sense a current state of the vehicle black box 200. The second sensing unit 240 may include a second motion sensing module 241 and performs an operation similar to that of the first motion sensing module (131 shown in FIG. 3). If the second sensing unit 240 is included in the vehicle black box 200, the second sensing unit 240 may not receive information about a three-dimensional motion from the vehicle navigation device 100.

The second storage 250 stores information necessary for operations of the vehicle black box 200 and information generated according to the operations of the vehicle black box 200. The information stored in the second storage 250 may be images captured by the camera module 221. The second storage 250 may be included in the vehicle black box 200 or may be a memory detachably set in the vehicle black box 200.

The second controller 270 outputs control signals for controlling operations of the vehicle black box 200. The second controller 270 may be affected by control signals of the first controller (170 shown in FIG. 3) of the vehicle navigation system (100 shown in FIG. 3). That is, the second controller 270 may be dependent on the first controller (170 shown in FIG. 3).

Figure 5:
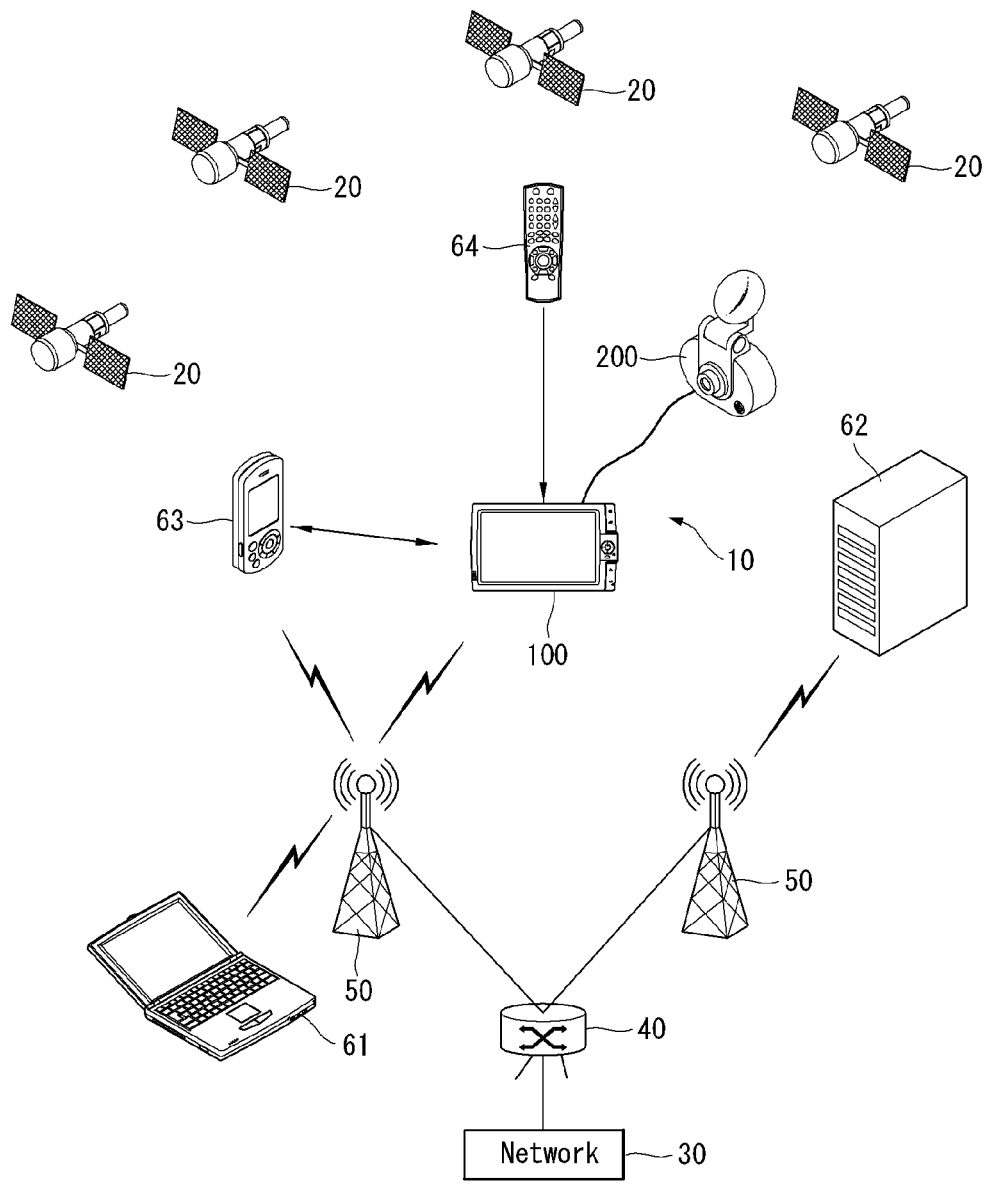
FIG. 5 illustrates a configuration of a communication network including the navigation system shown in FIG. 1.

FIG. 5 illustrates a configuration of a communication network including the navigation system 10 shown in FIG. 1.

Referring to FIG. 5, the navigation system 10 according to an embodiment of the present invention may be linked with various communication networks and other electronic devices 61 to 64.

The navigation system 10 may calculate a current location thereof using radio signals received from artificial satellites 20. The artificial satellites 20 may transmit L-band frequency signals having different frequency bands. The navigation system 10 can calculate the current location thereof on the basis of a time required for the L-band frequency transmitted from each artificial satellite 20 to arrive at the navigation system 10.

The navigation system 10 may wirelessly access a network 30 through a control station (ACR) 40 and a base station (RAS) 50 via the first communication unit (110 shown in FIG. 3). When the navigation system 10 is linked with the network 30, the navigation system 10 can exchange information with the electronic devices 61 and 62 linked to the network 30 by being indirectly with the electronic devices 61 and 62.

The navigation system 10 may indirectly access the network 30 through another device 63 having a communication function. For example, if the navigation system 10 does not include a device through which the navigation system 10 access the network 30, the navigation system 10 can communicate with the other device 63 having the communication function through the first near field communication module (117 shown in FIG. 3) or the like.

Figure 6:
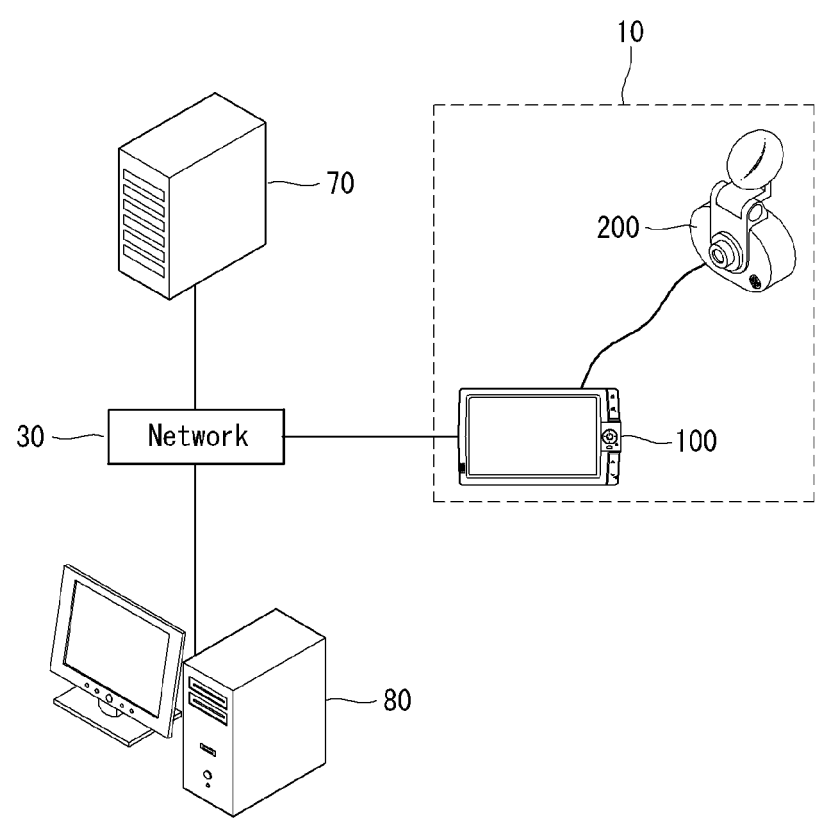
FIG. 6 illustrates a configuration of a service network including the navigation system shown in FIG. 1.

FIG. 6 illustrates a configuration of a service network including the navigation system shown in FIG. 1.

Referring to FIG. 6, the navigation system 10 may access the network 30 according to various communication schemes and may be connected to a server 70 or a user terminal 80 through the network 30. The navigation system 10 may transmit/receive information and data to/from the server 70 or the user terminal 80. Particularly, the navigation system 10 can transmit image data captured through the vehicle black box 200 to the server 70 or the user terminal 80.

The server 70 may be connected to the navigation system 10 or the user terminal 80 through the network 30. Furthermore, the server 70 transmits/receives data and information to/from the navigation system 10 or the user terminal 80. Particularly, the server 70 can transmit image data received from the navigation system 10 to the user terminal 80 at the request of the user terminal 80.

The server 70 may include various types of servers capable of using image data collected from the navigation system 10. For example, the server 70 can include a content server that provides collected image data as contents, an information providing server that uses collected image data to provide traffic information, a law enforcement agency server that uses collected image data to enforce a law, and an insurance company server that uses collected image data as evidential data.

The user terminal 80 accesses the network 30 through various communication schemes and may be connected to the navigation system 10 or the server 70. The user terminal 80 may be a terminal that includes a memory and a microprocessor to perform computational operation, such as a desktop computer, a UMPC (ultra mobile personal computer), a tablet PC, a PDA (personal digital assistant), a web pad, a cellular phone, etc. Furthermore, the user terminal 80 may be a terminal in which an application capable of reproducing image data is installed.

Figure 7:
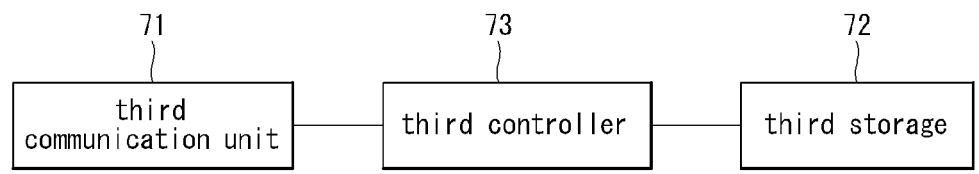
FIG. 7 is a block diagram of a server shown in FIG. 6.

FIG. 7 is a block diagram of the server 70 shown in FIG. 6.

Referring to FIG. 7, the server 70 includes a third communication unit 71, a third storage 72, and a third controller 73.

The third communication unit 71 accesses the network 30 through various communication schemes and transmits/receives data, information, etc. to/from the navigation system 10 or the user terminal 80 connected thereto via the network 30.

The third storage 72 stores information necessary for operation of the server 70 and information generated according to the operation. The third storage may be a memory installed in the server 70 or a detachable memory. The third storage 72 may be an independent storage unit connected to the server 70 through the network 30.

The third controller 73 stores, in the third storage 72, moving route information or image data received from the navigation system 10 through the third communication unit 71. In addition, the third controller acquires image data that satisfies at least one condition input through the user terminal 80 from the third storage 72 or from the navigation system 10 through the third communication unit 71. The third controller 75 transmits the acquired image data to the user terminal 80. The at least one condition input through the user terminal may include a theme, location information, time information, etc.

A method for providing images and operations of the navigation system and server to implement the same according to a first embodiment of the present invention will now be described in detail with reference to the attached drawings.

The method for proving images according to the first embodiment of the present invention may be implemented in the navigation system 10 and the server 70 described with reference to FIGS. 1 to 7.

Figure 8:
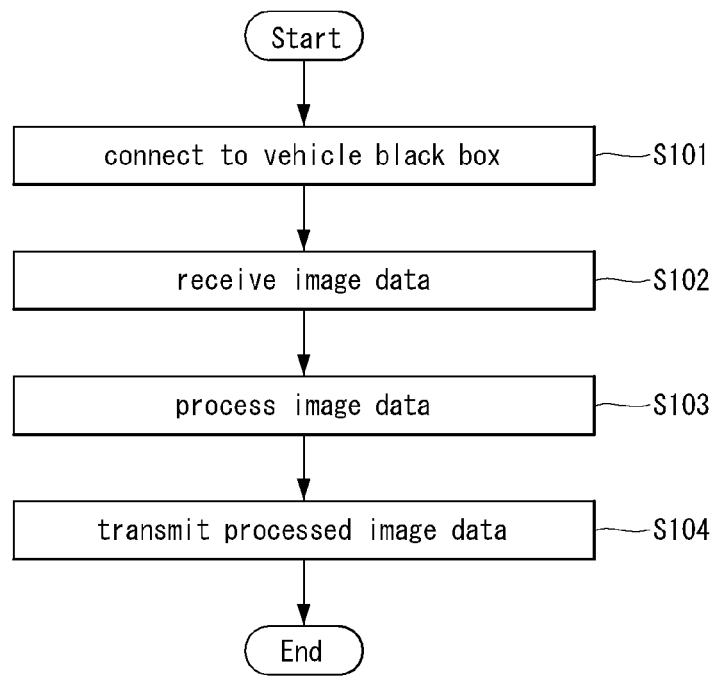
FIG. 8 is a flowchart illustrating a method for providing images of a vehicle navigation system according to a first embodiment of the present invention.
Figure 9:
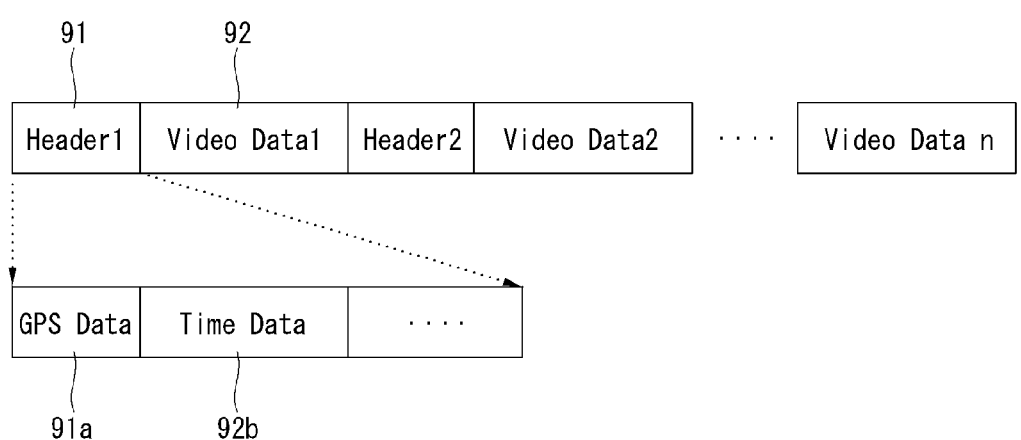
FIG. 9 illustrates exemplary processed image data mapped with location data and time data.
Figure 10:
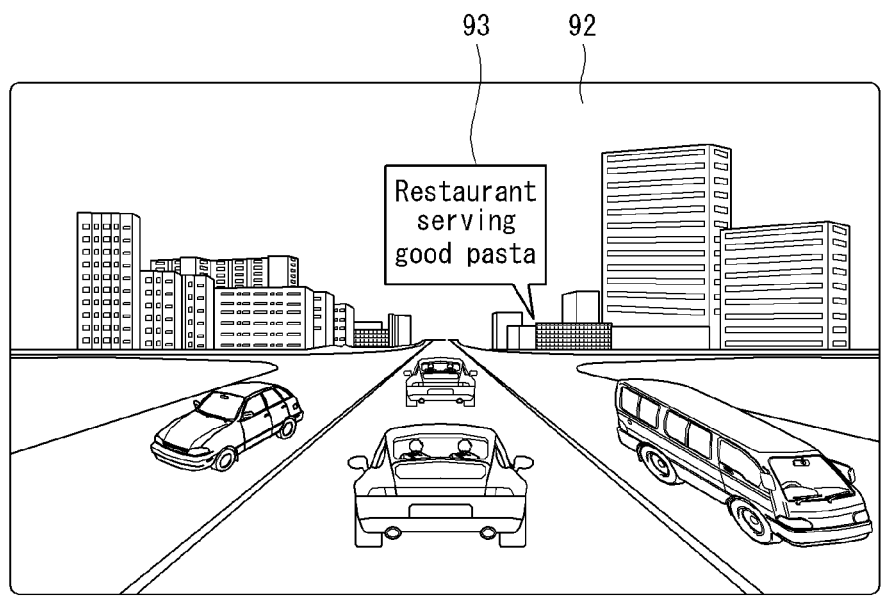
FIG. 10 illustrates exemplary processed image data including a note.
Figure 11:
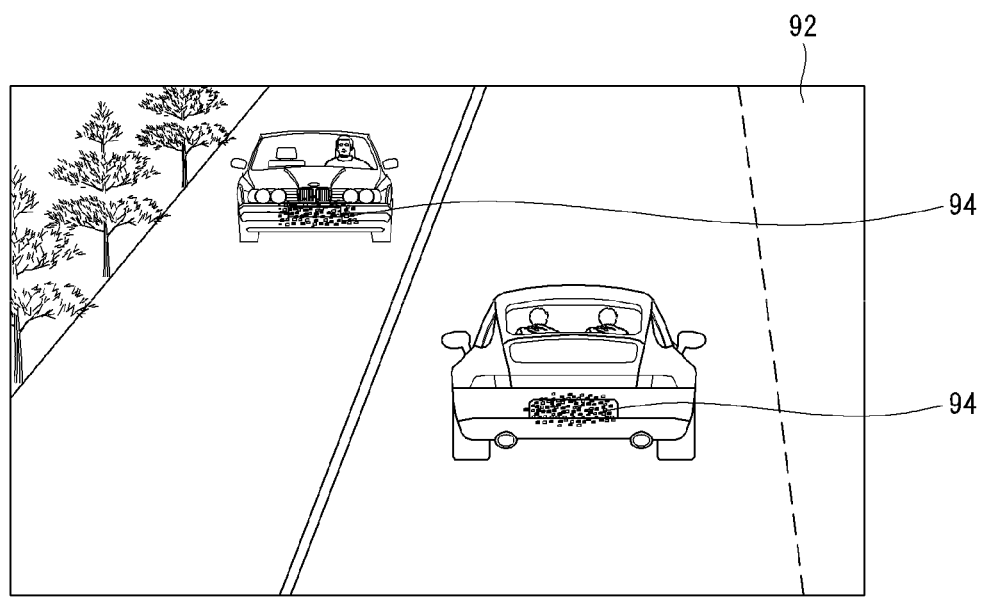
FIG. 11 illustrates exemplary processed image data from which a specific object has been filtered.

FIG. 8 is a flowchart illustrating an image providing method of the vehicle navigation system 100 according to the first embodiment of the present invention and FIGS. 9, 10 and 11 are diagrams for explaining an image sharing method of the vehicle navigation system 100 according to the first embodiment of the present invention.

Referring to FIG. 8, the first controller 170 is connected to the vehicle black box 200 through the first communication unit 110 (S101) and receives image data captured through the vehicle black box 200 from the vehicle black box 200 (S102).

The first controller 170 processes the image data received from the vehicle black box 200 according to application of the image data (S103).

For example, the first controller 170 can map location data or time data corresponding to the image data received from the vehicle black box 200 with the image data. FIG. 9 shows an example of processed image data to which location data and time data are mapped. Referring to FIG. 9, the processed image data includes a header 91 and video data 92. The header 91 may include corresponding location data 91a and time data 91b. Here, the location data mapped with the image data received from the vehicle black box 200 corresponds to a location at which the image data is acquired and includes GPS data or the like. The time data mapped with the image data received from the vehicle black box 200 corresponds to time when the image data is captured. The time data may be mapped with the image data when the vehicle black box 200 captures the image data and transmitted to the vehicle navigation system 100.

For example, the first controller 170 can select some of the image data received from the vehicle black box 200 to generate new image data. In this case, the first controller 170 can select and process only image data corresponding to a specific theme, such as good restaurant, gas station, travel destination, historic site, drive course, accident black spot or the like, on the basis of a control input.

Furthermore, the first controller 170 may include audio data, a note, etc. in the image data received from the vehicle black box 200 to process the image data into theme image data. In this case, the first controller 170 can insert audio data, a note, etc. input through the input unit 120 into the image data received from the vehicle black box 200 to generate image data corresponding to a specific theme such as good restaurant, gas station, travel destination, historic site, drive course, accident black spot or the like. FIG. 10 shows another example of processed image data with a note attached thereto. Referring to FIG. 10, the first controller 170 processes image data 92 received from the vehicle black box 200 by including a note 93 input through the input unit 120 in the image data 92.

In addition, the first controller 170 may filter a specific object included in the image data received from the vehicle black box 200. That is, the first controller 170 can filter the specific object included in the image data received from the vehicle black box 200 by decreasing the resolution of the specific object to lower than a predetermined value. Here, the filtered object is an object that causes invasion of privacy or breaches the public interest when opened to the public and may include faces of people, license plates, etc. A method for decreasing the resolution of image data may use mosaic processing. FIG. 11 shows another example of processed image data including a filtered specific object. Referring to FIG. 11, the first controller 170 can filter a specific object 94 included in the image data received from the vehicle black box 200 by mosaic-processing the specific object 94.

Referring back to FIG. 7, the first controller 170 transmits the processed image data to the user terminal 80 or the server 70 connected through the first communication unit 120 (S104). Here, the first controller 170 may select image data that satisfies at least one condition received from the user terminal 80 or the server and transmit the selected image data to the user terminal 80 or the server 70. If image data transmitted to the user terminal 80 or the server 70 is data processed into theme image data, the first controller 170 may map theme information with the image data and transmit the image data mapped with the theme information.

Figure 12:
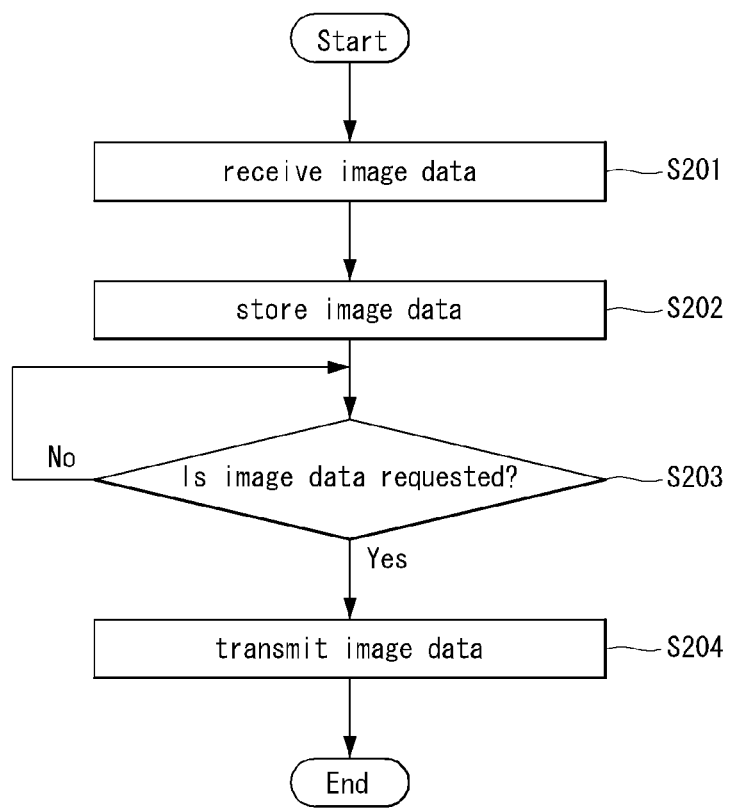
FIG. 12 is a flowchart illustrating an image providing method of a server according to the first embodiment of the present invention.

FIG. 12 is a flowchart illustrating an image providing method of the server 70 according to the first embodiment of the present invention.

Referring to FIG. 12, the third controller 73 of the server 70 receives image data from the navigation system 10 through the third communication unit 71 (S201) and stores the received image data in the third storage 72 (S202). The third controller 73 may classify image data according to image data type, location data or time data mapped with the image data, and identification information of the navigation system that transmits the image data and store the classified image data.

Furthermore, the third controller 93 may filter a specific object included in the received image data and then store the image data.

Upon receiving request for image data from the user terminal 80 through the third communication unit 71 (S203), the third controller 73 transmits, to the user terminal 80, image data that satisfies at least one condition received from the user terminal 80 from among image data stored in the third storage 72 (S204). Here, the at least one condition received from the user terminal 80 may include theme information, location information, time information, etc.

For example, the third controller 73 can receive, from the user terminal 80, information about a good restaurant corresponding to a specific location as a search condition. In this case, the third controller 73 can obtain image data that satisfies the search condition on the basis of theme information, location information, etc. mapped with the image data.

Furthermore, the third controller 73 can receive, from the user terminal 80, image data captured at a specific location at specific time as a search condition. In this case, the third controller 73 can obtain image data that satisfies the search condition on the basis of location information, time information, etc. mapped with the image data.

Figure 13:
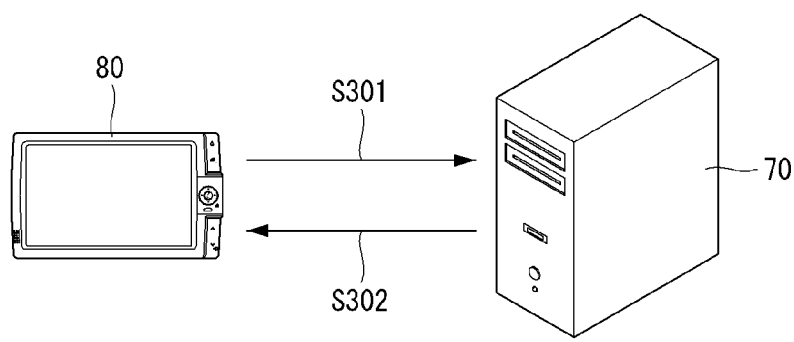
FIG. 13 illustrates an operation of the server to provide image data to a user terminal according to the first embodiment of the present invention.

FIG. 13 illustrates an exemplary operation of the server 70 to provide image data to the user terminal according to the first embodiment of the present invention.

Referring to FIG. 13, in the event of a car accident, the user terminal 80 transmits, to the server 70, location information and time information corresponding to the accident generation spot (S301).

Then, the server 70 obtains image data corresponding to the received location information and time information from the third storage 72 or the navigation system 10 and transmits the image data to the user terminal 80 (S302).

A method for providing images and operations of the navigation system and server to implement the same according to a second embodiment of the present invention will now be described in detail with reference to the attached drawings.

The method for proving images according to the second embodiment of the present invention may be implemented in the navigation system 10 and the server 70 described with reference to FIGS. 1 to 7.

Figure 14:
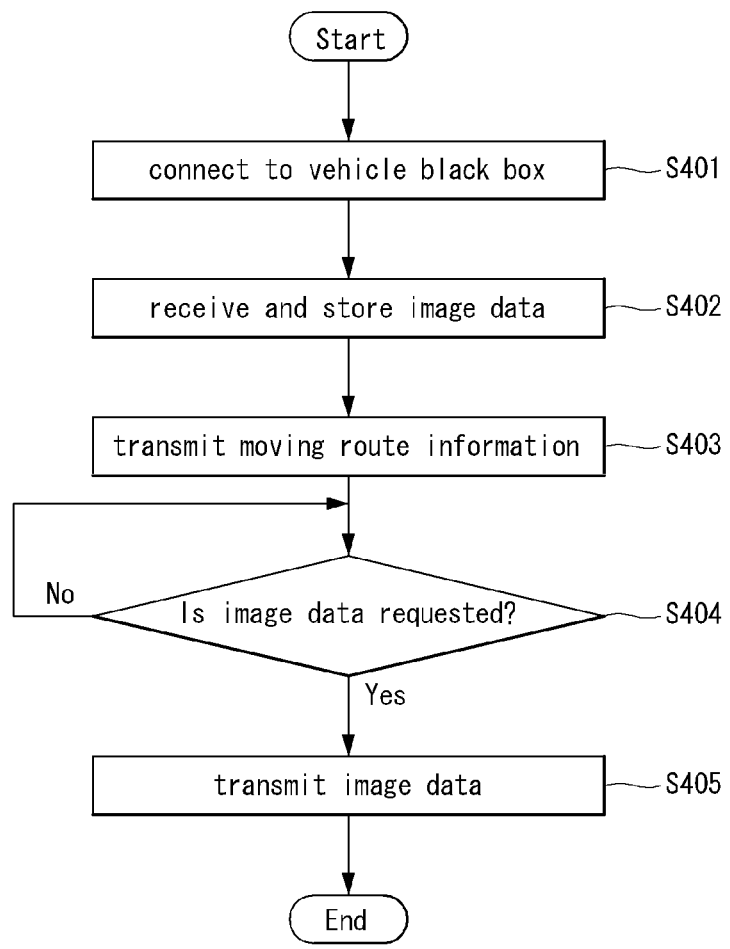
FIG. 14 is a flowchart illustrating a method for providing images of a vehicle navigation system according to a second embodiment of the present invention.

FIG. 14 is a flowchart illustrating an image providing method of the vehicle navigation system 100 according to the second embodiment of the present invention.

Referring to FIG. 14, the first controller 170 is connected to the vehicle black box 200 through the first communication unit 110 (S401). The first controller 170 receives image data captured through the vehicle black box 200 from the vehicle black box 200 and stores the received image data in the first storage 150 (S402). Here, the first controller 170 can map location data, time data, etc., which correspond to the image data received from the vehicle black box 200, with the image data and store the mapped data, as shown in FIG. 9. Further, the first controller 170 can filer a specific object included in the image data received from the vehicle black box 200, and then store the image data, as shown in FIG. 11.

The first controller 170 generates moving route information of a vehicle on the basis of vehicle location information obtained through the first location information module 111 and transmits the generated moving route information to the server 70 connected through the network 30 (S403). Here, the moving route information represents a time and location that the vehicle passes by.

Upon receiving a request for image data that satisfies at least one condition from the server 70 (S404), the first controller 170 obtains the image data that satisfies the condition from the second storage 150 and transmits the obtained image data to the server 70 (S405). Here, the first controller 170 may map identification information of the navigation system 10 with the image data and transmit the image data mapped with the identification information of the navigation system 10.

Figure 15:
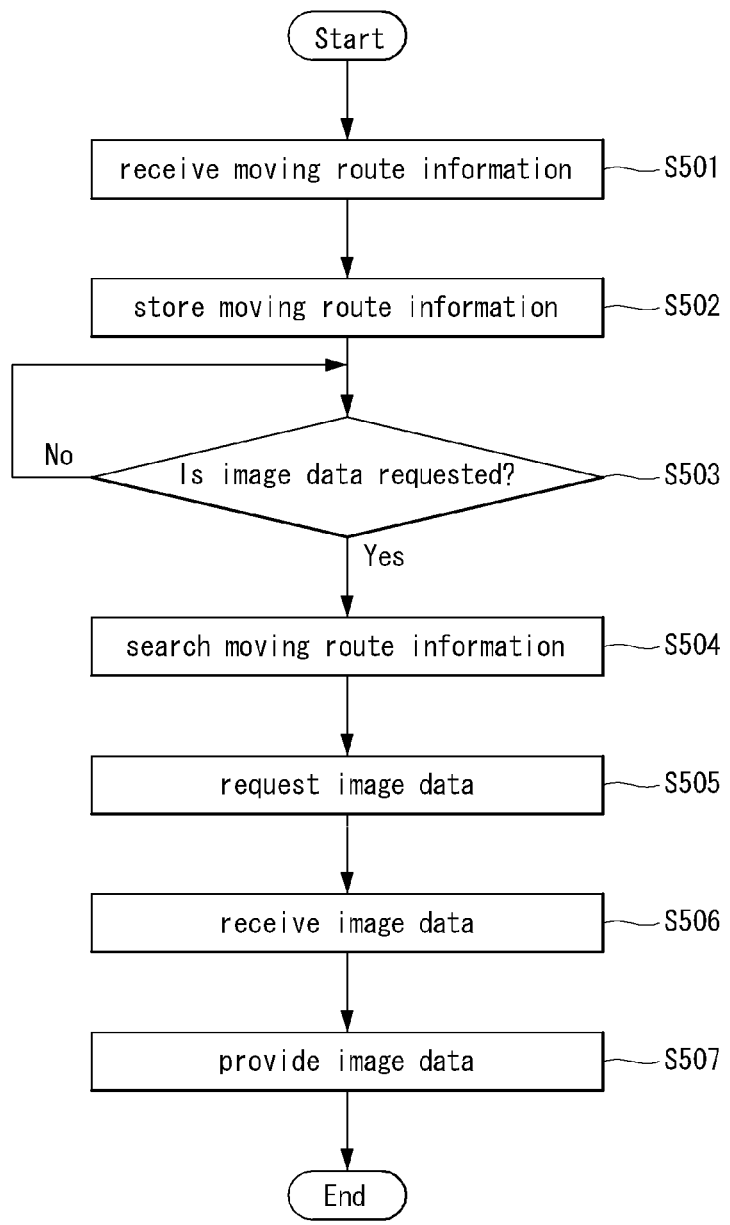
FIG. 15 is a flowchart illustrating an image providing method of a server according to the second embodiment of the present invention.

FIG. 15 is a flowchart illustrating an image providing method of the server 70 according to the second embodiment of the present invention.

Referring to FIG. 15, the third controller 73 of the server 70 receives the moving route information from the navigation system 10 through the third communication unit 71 (S501) and stores the received moving route information in the third storage 72 (S502). The third controller 73 may classify image data according to location data or time data corresponding to the moving route information and identification information of the navigation system that transmits the moving route information, and store the classified image data.

Upon receiving request for image data from the user terminal 80 through the third communication unit 71 (S503), the third controller 73 searches the moving route information stored in the third storage 72 for moving route information that satisfies at least one condition corresponding to the requested image data (S504). For example, when image data captured at a specific location at a specific time is requested, the third controller 73 can search moving route information that satisfies location data and time data corresponding to the image data.

When moving route information that satisfies the condition is present, the third controller 73 checks the identification information of the navigation system 10 that transmits the moving route information. Then, the third controller 73 requests the navigation system 10 to provide image data corresponding to the searched moving route information (S505). That is, the third controller 73 requests the navigation system 10 to provide image data that satisfies the location data and time data corresponding to the searched moving route information.

Upon reception of the image data from the navigation system 10 (S506), the third controller 73 transmits the received image data to the user terminal 80 (S507). Here, the third controller 73 may filter a specific object included in the image data and then transmit the filtered image data to the user terminal 80. For example, the third controller 73 can mosaic-process an object included in image data, which may cause invasion of privacy or breach the public interest and transmit the processed image data to the user terminal 80.

Figure 16:
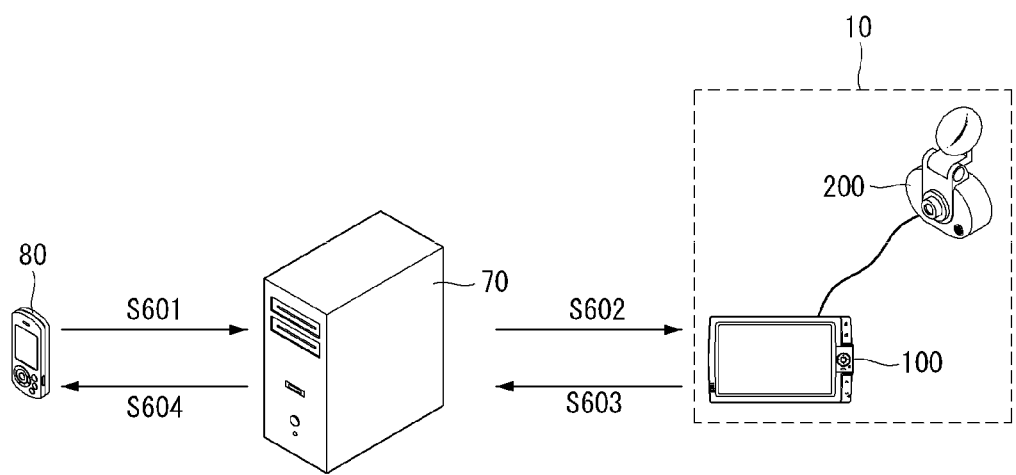
FIG. 16 illustrates an operation of the server to provide image data to a user terminal according to the second embodiment of the present invention.

FIG. 16 illustrates an exemplary operation of the server 70 to provide image data to the user terminal according to the first embodiment of the present invention.

Referring to FIG. 16, in the event of a car accident, the user terminal 80 transmits, to the server 70, location information and time information corresponding to the accident generation spot (6301).

Then, the server 70 searches previously stored moving route information for moving route information corresponding to the received location information and time information and obtains identification information of the navigation system 10 corresponding to the searched moving route information. Then, the server 70 requests the navigation system 10 to provide image data corresponding to the searched moving route information (S602).

Upon reception of the image data from the navigation system 10 (S603), the server 70 transmits the image data to the user terminal 80 (S604).

According to the above-mentioned embodiments, the navigation system 10 can share image data captured through the vehicle black box 200 with other users. Accordingly, users can simulate a moving route to a destination through the image data captured by other vehicles. Furthermore, the users can obtain useful information about good restaurants, travel sites, accident black sports, etc. through theme image data generated by other navigation systems. In addition, it is possible to use image data captured by the navigation system 10 as legal evidential data and prevent crime and car accident dispute.

Moreover, it is possible to make profits or be provided with various benefits by processing image data obtained through the navigation system 10 into theme image data by inserting audio data, a note, etc. into the image data and uploading the them image data to the content server 70.

The foregoing embodiments may be implemented as code that can be written to a computer-readable recording medium and can thus be read by a processor. The computer-readable recording medium may be any type of recording device in which data can be stored in a computer-readable manner. Examples of the computer-readable recording medium include a ROM, a RAM, a CD-ROM, a magnetic tape, a floppy disc, an optical data storage, and a carrier wave (e.g., data transmission through the Internet). The computer-readable recording medium can be distributed over a plurality of computer systems connected to a network so that computer-readable code is written thereto and executed therefrom in a decentralized manner. Functional programs, code, and code segments needed for realizing the embodiments herein can be construed by one of ordinary skill in the art.

While the present invention has been particularly shown and described with reference to exemplary embodiments thereof, it will be understood by those of ordinary skill in the art that various changes in form and details may be made therein without departing from the spirit and scope of the present invention as defined by the following claims.

INDUSTRIAL APPLICABILITY

According to the present invention, it is possible to provide a server, a navigation system, a vehicle navigation system and a method for providing images of the vehicle navigation system, which enable images captured by a vehicle black box to be made into contents or used in various fields.

What is claimed is:

1. A vehicle navigation system comprising:
   a communication unit;
   a location information module for providing location information corresponding to first image data; and
   a controller configured to be connected to a vehicle video camera through the communication unit,
      to obtain the first image data from the vehicle video camera through the communication unit,
      to obtain location information from the location information module and
      to filter a specific object included in the first image data by decreasing the resolution of the specific object included in the first image data to lower than a predetermined value to generate second image data with a filtered portion of the first image data corresponding to the specific object amongst an unfiltered portion of the first image data.

2. The vehicle navigation system of claim 1, wherein the controller is configured to filter the specific object by mosaic-processing the specific object.

3. The vehicle navigation system of claim 1, wherein the controller is configured to transmit the second image data to a user terminal or a server connected through the communication unit.

4. The vehicle navigation system of claim 3, wherein the controller is configured to transmit the second image data to the user terminal or the server when location information corresponding to the second image data is received from the user terminal or the server.

5. A vehicle navigation system of claim 1, further comprising an input unit, wherein the controller is configured to generate the second image data by also mapping audio data or a note input through the input unit with the first image data.

6. A vehicle navigation system comprising:
   a storage;
   a communication unit; and
   a controller configured
      to store, in the storage, image data obtained from a vehicle video camera connected through the communication unit,
      to receive at least one condition from a server or a user terminal connected through the communication unit,
      to filter a specific object from the image data that satisfies the at least one condition by decreasing the resolution of the specific object included in the image data to lower than a predetermined value so as to generate filtered image data having a filtered portion of the image data corresponding to the specific object together with unfiltered portions of the image data, from among the image data stored in the storage, and
      to transmit the filtered image data to the server or the user terminal based on the at least one condition.

7. The vehicle navigation system of claim 6, wherein the controller is configured to map location information and time information corresponding to the image data obtained from the vehicle video camera with the image data and to store the mapped data in the storage.

8. The vehicle navigation system of claim 6, further comprising a path guide unit for
   determining a position of the vehicle,
   receiving an input of the destination, and
   generating and guiding a path between the destination and the position of the vehicle,
   wherein the dynamic item unit generates a dynamic item based on the position of the vehicle, the destination, and the path, if information exceeding a critical value does not exist in the sensor information.

9. The vehicle navigation system of claim 6, wherein the at least one condition includes at least one of theme information, location information and time information.

10. The vehicle navigation system of claim 6, wherein the controller is configured
    to obtain moving route information on the basis of location information of a vehicle and
    to transmit the obtained moving route information to the server.

11. A navigation system comprising:
    a vehicle video camera configured to be installed in a vehicle and to obtain first image data related to driving of the vehicle; and
    a vehicle navigation system configured to be connected to the vehicle video camera to provide location information corresponding to the first image data, to provide time information corresponding to the first image data and to filter a specific object from the first image data by decreasing resolution of a specific object included in the first image data to lower than a predetermined value to generate second image data with a filtered portion of the first image data corresponding to the specific object amongst an unfiltered portion of the first image data.

12. The navigation system of claim 11, wherein the vehicle navigation system is configured to filter the specific object included in the first image data by mosaic-processing the specific object.

13. The navigation system of claim 12, wherein the vehicle navigation system is configured to transmit the second image data to a server or a user terminal connected through a network.

14. A server comprising:
a storage;
a communication unit; and
a controller configured
to store, in the storage, image data obtained from at least one navigation system connected through the communication unit,
to obtain image data that satisfies at least one condition, from among the image data stored in the storage,
to filter a specific object included in the image data that satisfies the at least one condition by decreasing the resolution of the specific object included in the image data to lower than a predetermined value so as to generate filtered image data having a filtered portion of the image data corresponding to the specific object together with unfiltered portions of the image data, and
to output the filtered image data based on the at least one condition.

15. The server of claim 14, wherein the controller is configured
to classify the image data obtained from the at least one navigation system on the basis of location information, time information or theme information mapped with the image data obtained from the at least one navigation system and
to store the classified image data.

16. The server of claim 14, wherein the controller is configured to filter the specific object by mosaic-processing the specific object.

17. A server comprising:
a communication unit; and
a controller configured to be connected to at least one navigation system through the communication unit and
to obtain moving route information that satisfies at least one condition, from among moving route information received from the at least one navigation system, and
to request the navigation system corresponding to the obtained moving route information to provide image data that satisfies the at least one condition, and
to filter a specific object from the image data by decreasing the resolution of the specific object included in the image data to lower than a predetermined value so as to generate filtered image data having a filtered portion of the image data corresponding to the specific object together with unfiltered portions of the image data.

18. The server of claim 17, wherein the moving route information represents a time and a location that a corresponding vehicle passes by.

19. The server of claim 17, wherein the at least one condition includes at least one of location information and time information.

20. A method for providing images of a vehicle navigation system, the method comprising:
connecting the vehicle navigation system to a vehicle video camera;
acquiring first image data from the vehicle video camera;
filtering a specific object from the first image data by decreasing the resolution of the specific object included in the image data to lower than a predetermined value so as to generate second image data having a filtered portion of the image data corresponding to the specific object together with unfiltered portions of the image data; and
transmitting the second image data to a server or a user terminal connected through a network.

21. A non-transitory computer readable medium storing a program for executing a method for providing images of a vehicle navigation system, the method comprising:
connecting the vehicle navigation system to a vehicle video camera;
acquiring first image data from the vehicle video camera;
filtering a specific object from the first image data by decreasing the resolution of the specific object included in the image data to lower than a predetermined value so as to generate second image data having a filtered portion of the image data corresponding to the specific object together with unfiltered portions of the image data; and
transmitting the second image data to a server or a user terminal connected through a network.

* * * * *